W. F. McKAY.
METHOD OF MAKING PREPARED ROOFING.
APPLICATION FILED DEC. 7, 1915.
1,351,181. Patented Aug. 31, 1920.
4 SHEETS—SHEET 4.
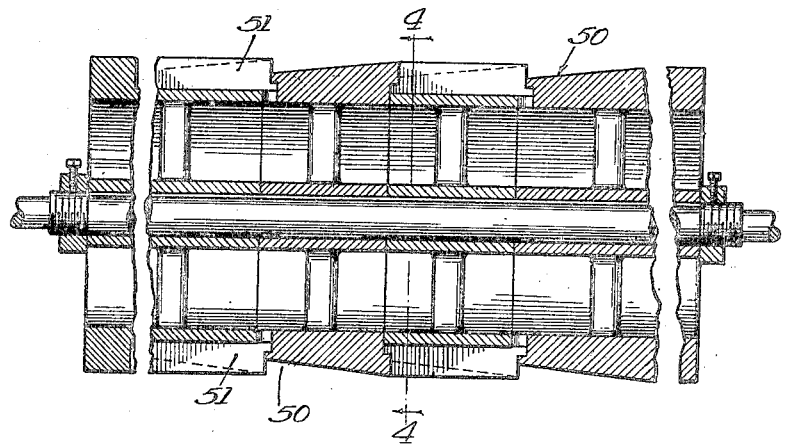
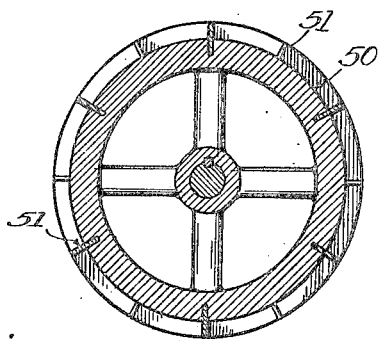
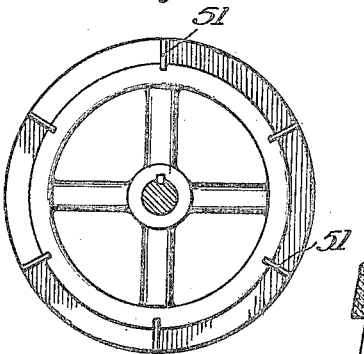
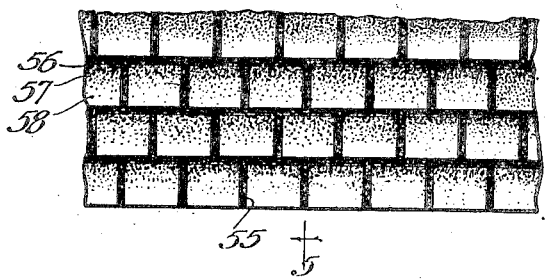
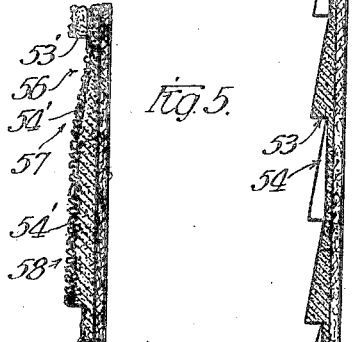
Witnesses:
Robert H. Weir
Arthur W. Carlson
Inventor
William F. McKay

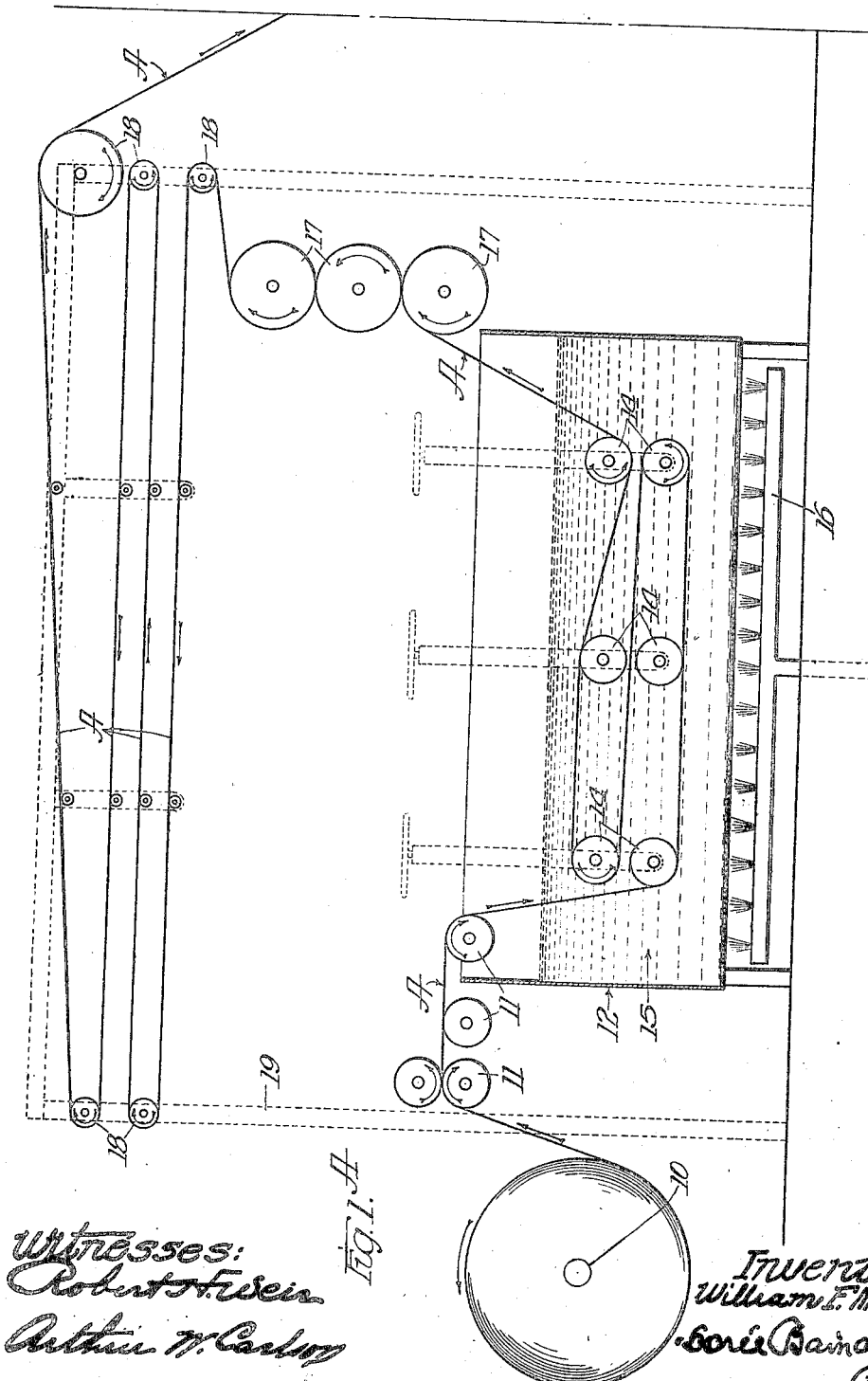

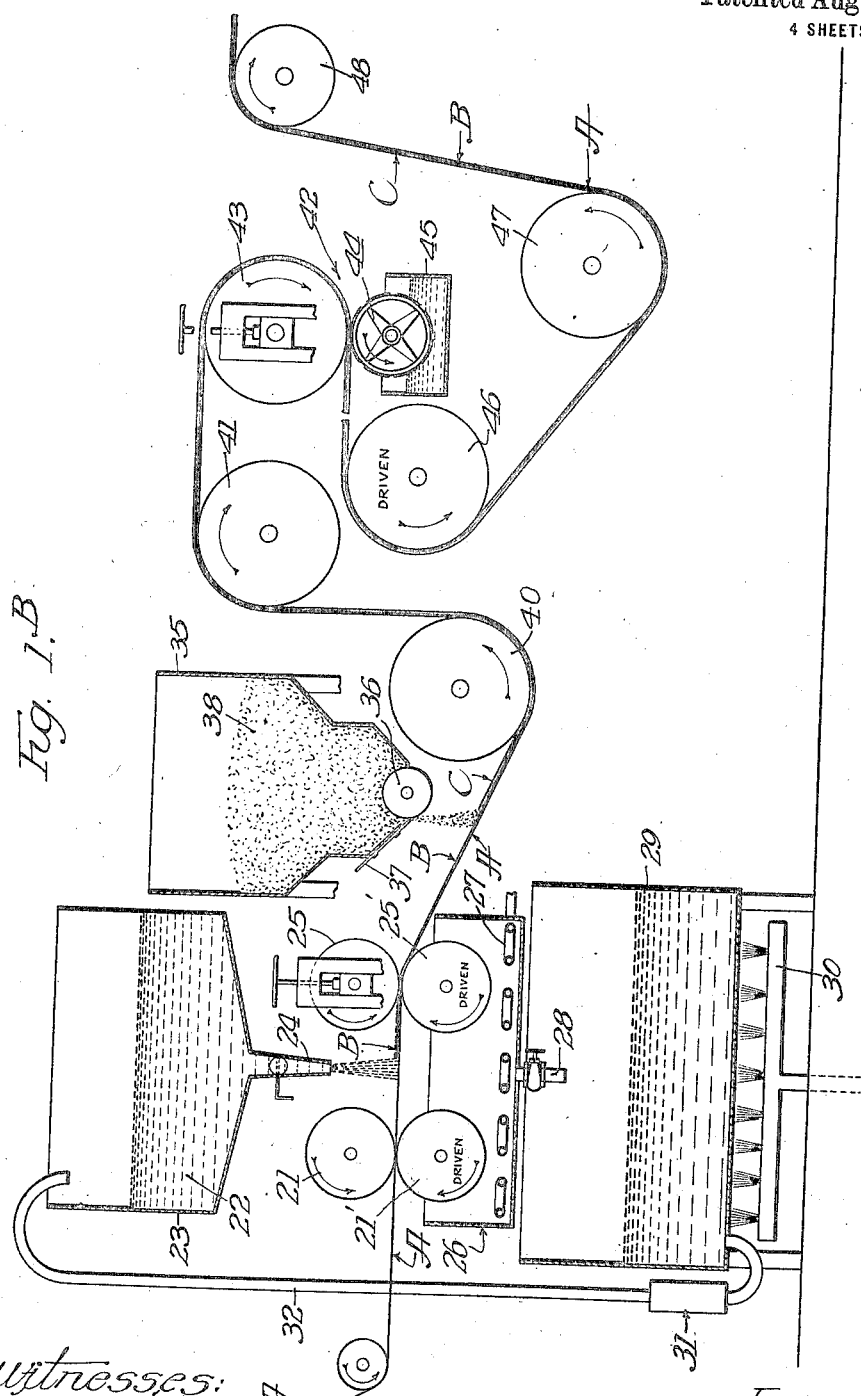

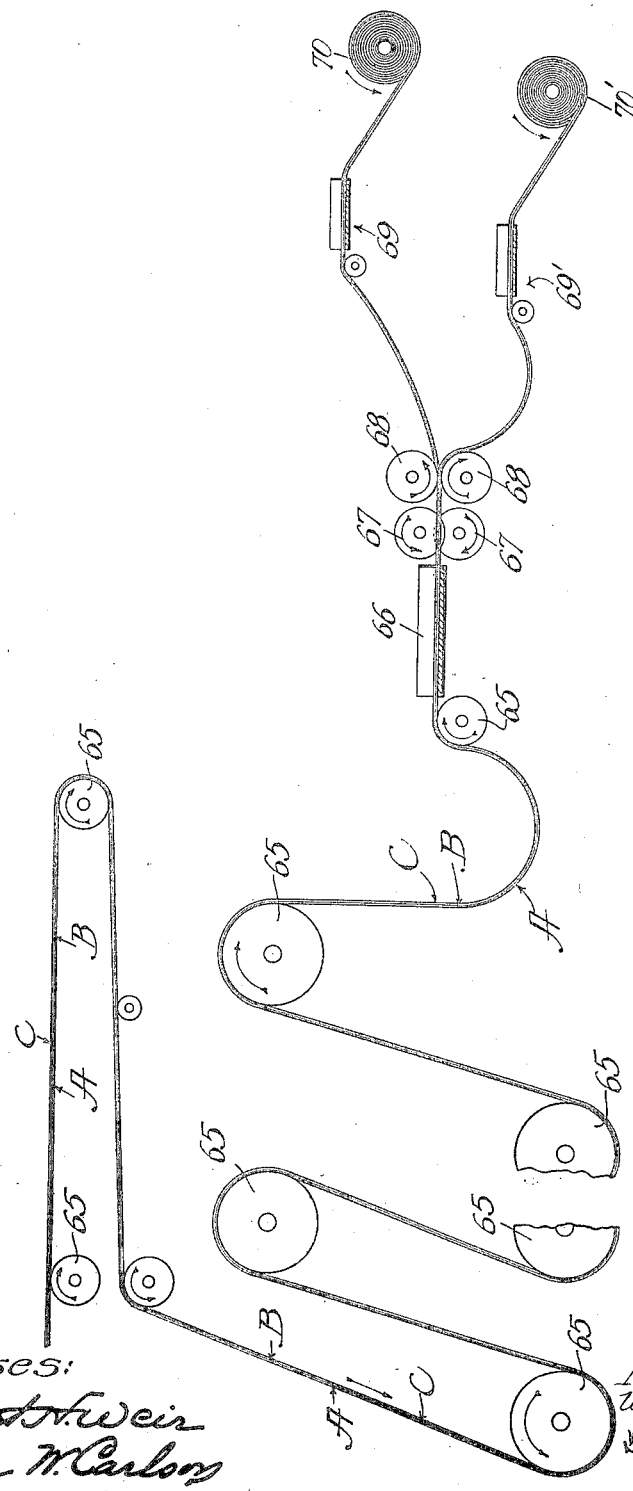

UNITED STATES PATENT OFFICE.

WILLIAM F. McKAY, OF LA GRANGE, ILLINOIS.

METHOD OF MAKING PREPARED ROOFING.

1,351,181.      Specification of Letters Patent.      Patented Aug. 31, 1920.

Application filed December 7, 1915. Serial No. 65,613.

*To all whom it may concern:*

Be it known that I, WILLIAM F. McKAY, a citizen of the United States, residing at La Grange, in the county of Cook and State of Illinois, have invented certain new and useful Improvements in Methods of Making Prepared Roofing, of which the following is a specification.

My invention relates to the art of making prepared roofing, and has for its general object to provide a method of making, in sheet form, prepared roofing material that, when laid, will simulate in relief desired patterns of "ordinary roofs", such as shingle roofs for example.

A further object of my invention is to provide a method of producing, in prepared roofing, fictitious or illusory shadow effects that, patterned suitably on prepared roofing material, create the optical impression, in the laid roofing, of deep relief effects, and that preferably exaggerate true-relief patterns physically provided in the laid roofing.

Other objects of my invention are to provide a method of manufacture that is simple, inexpensive, efficient, and productive of commercially-advantageous roofing-material; and other objects will become apparent to those skilled in the art from the following description taken in conjunction with the accompanying drawings, wherein—

Figures 1$^A$, 1$^B$, and 1$^C$ jointly represent, conventionally, means suitable for the practice of my invention.

Fig. 2 represents a pattern roller in longitudinal section.

Fig. 3 is an end elevation thereof.

Fig. 4 is a section of the roller on line 4—4 of Fig. 2.

Fig. 5 is a sectional view of one product of my method of manufacture.

Fig. 6 is an exaggerated fragmental section of a "shadow effect" shingle formation.

Fig. 7 is a plan view of a "shadow-effect" shingle-imitation sheet.

By the practice of my invention I am able to produce, by a continuous process, sheets of ornamental roofing of any desired length adapted subsequently to be cut into units of any desired size, and having impressed patterns in low relief simulating the designs of ordinary roofs, such for instance as shingles. Further by the practice of my invention I produce ornamental roofing sheets having predetermined illusory-shadow areas wrought by exposing a dark plastic layer in appropriate relation to a lighter colored color-coat and arranged to afford in the laid roofing an illusion of depth of relief greater than any physically present in the structure. Also, by the practice of my invention I may combine the advantageous effects of true relief expressed in the physical conformation of the structure, and the illusory shadow-effect mechanically produced, and such benefits I attain by a series of steps resulting in the rapid, continuous and economical production of a commercially, mechanically, and artistically-improved article.

For purposes of full disclosure I have shown in the drawing a single set of instrumentalities suitable for operation in accordance with my invention to produce a shingle-simulating roofing that may be sold in sheets and with the shingles simulated by slight elevations and depressions in a main plastic coating of the sheet, but in its broader aspects my invention is not limited to the pattern-form that is imparted to the roofing nor to the size of the article as finally cut for sale. Also I have shown the production of shadow effect only with respect to such a shingle-pattern roofing, but it will be understood that in its broader aspect the steps of my process producing the shadow-effect construction may be practised with respect to any desired pattern and on pieces of any desired size.

10 indicates a roller carrying a web A of foundation material, preferably pervious felt, of suitable width, that is fed over guides 11 to a tank 12 into and through which it passes under the guidance of rollers 14 that direct it in a suitable series of courses or flights to keep each portion of the felt in the tank for an adequate time, say 1 or 3 minutes depending on thickness. The tank contains an asphaltic compound 15, as a suitable form of water proofing material, and the compound is kept hot for effective penetration into the felt, by a heater 16.

The web A passes thence through pinch rollers 17 that remove surplus compound, and then the saturated felt passes in successive courses over the rollers 18 of a drying rack 19, so that, by exposure to the air the saturated felt is dried sufficiently for ease of further handling. When it leaves the drier the felt is preferably still somewhat "tacky".

The web A passes guidedly to driven rollers 21, 21', that serve to draw it from the original supply-roller 10, and next the web is coated, preferably on one side only, with a layer of weather-proofing compound B, preferably asphaltic, that when supplied is hot and thickly fluid, but that in cooling will hold the shape, into which it may be molded and when thoroughly cooled, will be hard enough to preserve its contour under maximum sun-heat, The body of compound, shown at 22, is supplied from a hopper-tank 23 through spreading-spout 24 located between the roller-pair 21, 21' and a succeeding, adjustable roller-pair 25—25' which determines the thickness of the coating. Surplus material escapes over the edges of the web into a tank 26 into which the rollers 21', 25' dip, said tank preferably being provided with a heat coil 27 and with an outlet valve 28 that leads into a main tank 29 in which a store of the compound is kept hot by a heater 30 and from which the hot compound is pumped, as needed, into hopper-tank 23, by pump 31, through piping 32.

Usually one side only of the web is coated with the compound B, but when it is desired to coat both sides, the valve 28 is closed or adjusted to maintain a level of compound in tank 26 sufficient to immerse the lower part of the rollers 21', 25', and such rollers carry the compound to the under side of the web.

Beyond the thickness-determining rollers 25—25', the weather-resisting layer or coating B, while hot, is coated preferably uniformly, with a top dressing of suitable comminuted material supplied from a hopper 35 that is provided with a suitable feed regulator and agitator, as in roller 36, and valve slide 37. When, as in some instances may be desirable, it is intended to supply a uniform-colored dressing that will extend uninterruptedly over the top surface of the sheet when completed, the valve is adjusted and the hopper is used, to supply a powdered substance, as powdered slate, soapstone, talc, or the like; and when "shadow-effect" roofing, as hereinafter described, is to be produced, the valve is suitably adjusted, and the hopper used, to supply a relatively thick layer of predominatingly coarser material, such, for example, as granules and flakes of slate or sandstone such as will mainly not pass through a 40 mesh screen but will mainly pass a 10 mesh screen.

Powdered material employed in the top dressing has the qualities of giving uniform superficial appearance of gray, red, or other color as selected, to the finished product, avoiding stickiness throughout the whole top surface, and adding in some degree to the ultimate weather resisting qualities of the roofing, for the powdered particles constitute so uniform and fine a dressing that they remain resident on the top surface of the asphaltic coating throughout the subsequent treatment of the coated web, there being in such a powdered coating an absence of those extensive and communicating voids that characterize a coarser granular dressing and that permit the shadow-effects hereafter described to be obtained.

Therefore, for purposes of further description I will assume that the body 38 of material in the hopper 35 is of the coarser character; and the material employed, while it may be widely varied in specific nature should be firm or solid enough to withstand pressure without losing its shape, should be coarse enough to afford many and relatively extensive communicating voids when laid in a layer that will cover and conceal the underlying black plastic material to which the layer adheres, and, preferably, it should be composed of particles irregular in contour.

The rather-thick layer of preponderatingly coarse particles—thickly enough laid to conceal substantially completely the black asphaltic layer B—is pressed lightly and uniformly on the yet-mobile asphaltic layer, as by passing the web under a water-cooled smoothing roller or drum 40, and thence the web is led over an annular guide roller 41 to the pattern-producing means 42.

The pattern producing means 42 may take divers forms, that which I prefer and show being a backing roller 43 over which the back of the sheet runs and adjustable with respect to a pattern-surfaced pressure-roller 44 that may be of metal, kept wet for and prevention from sticking by running its lower portion in a bath of water (preferably soapy) in trough 45. The still-hot plastic coating is in condition to receive and retain patterns impressed therein by the firmly opposed pressure of the pattern roller, and the surface-conditions brought about at this step of the process remain undisturbed as the web passes on over a driven roller 46 and idlers 47 and 48 to the cooling apparatus where the coated web is cooled to take its final "set" before being divided and rolled for shipping.

In the roofing industry the simulation of shingles in prepared roofing is but one manifestation of the effect that has been made for many years past to provide a prepared roofing which, when laid, will be relieved of the displeasingly thin, cheap-looking monotonous appearance that has characterized sheet-roofing generically. Roofing has been provided with edges cut to simulate shingles, tile, and other ordinary roof-units and has been laid or built up in overlapping courses, either in single color or in alternating colors, and sharp outlines have been presented in contrasting colors, and other more or less expensive devices have been devised in order to overcome the serious objection, first mentioned. But such attempts have failed to attain satisfactory imitations of ordinarly roofs because of one insurmountable limitation, namely lack of physical depth in the roofing-material adequately to represent shingle-butts, tile butts, or other physical projections characteristic of the ordinary roofs. Comparative thinness is a necessity in most forms of prepared roofing, for when thickened to more than, say one eighth or one sixth of an inch as a maximum, the increased expense and weight of the material detracts from the very advantages, of low cost, small shipping expense, ease of handling, etc., that make prepared roofing a merchantable commodity. And especially in any roofing to be sold in roll form, comparative uniformity of depth of the coating material is highly desirable, if not imperative, in order that the material may be rolled and unrolled without injuring its exposed surface, and may not be damaged in use by unequal expansion and contraction of portions of different thickness.

By my present process I am able to provide in one very advantageous fashion prepared roofing taking a wide variety of specific forms, and which, when laid, will accentuate any relief, or differences of elevation in the laid surface, by fictitious "deep shadow" areas and "shadow-blend" areas that create the optical illusion of depth of relief much in excess of the actual relief afforded, or that can be afforded, within the depth of the roofing material.

In carrying out my present invention I provide the coarse or granular color-layer C, as described, of material of a relatively light color and employed the dark, generally black, color of the asphaltic layer in predetermined display with respect to the color-layer material to fictitiously present the desired deep shadow and shadow-blend areas. In so doing I operate upon the layer E of light colored, coarse material, that is initially laid adheringly on the surface of the black plastic layer to cover the same, depressing the particles to submerge them to their crests or pressure-contact surfaces in the asphaltic substance in the areas that have been selected for representation of deep shadow, and depressing them to gradually decreasing extent in the shadow-blend areas between the said deep shadow areas and those full-color areas where the color layer continues resident on top of the plastic layer for substantially covering and effectively concealing the black asphaltic coat. It will be appreciated that, as thickly laid on and lightly pressed upon the surface of the asphaltic coat B, the coarse particles of the color-layer C present very many irregular surface voids and that the layer as a whole is readily permeable by the hot asphalt when pressure is applied to the contact surfaces of the granules to depress them into asphaltic compound. Hence, the farther the granules are depressed the more the black asphaltic material is displayed and when complete submergence of the granules to their crests is attained the black predominates over the color of the granular coat.

Of course the submergence of the color-coat produces, in itself, some thinning of the sheet below the maximum depth represented by the areas where the color coat is fully exposed, and it is my preference that deep shadow values be expressed in areas where in the laid roof, maximum depth of true relief is physically presented.

It will be apparent that in practice many and varied shadow effect patterns may be impressed in accordance with the desired ornamental or imitation-effects in the finished roof, and that the single exemplification of this phase of my invention herein given, in a shingle-roof imitation, is for purposes of disclosure only and not by way of limitation.

As herein shown, the pattern roller 44 has its surface arranged in a series of courses 50 corresponding with taper courses of a shingle roof, and the narrow blades 51 cross the tapered recesses at intervals to simulate, in the product, kerfs or open spaces between adjacent shingles of the given course.

In practice the pressure exerted on the rolls should be such, and each roll-course should be so shaped that the plastic material is forced into shape presenting in low relief shingle-butt simulations 53, in the form of abrupt edges which bottom at the lowest levels of the taper-surfaces that conform somewhat to the slope of a shingle face.

Where the surface color is to be uniform, due to a top dressing of powdered material, and depth of physical relief alone is depended on for simulation of the shingle-roof appearance, the roll-courses should preferably be made with taper faces throughout, so as to produce an effect as shown in Fig. 5, and the pressure should best be such as to produce as high relief as is physically possible with the roll. Where shadow-effect is employed, however, as illustrated in Figs. 6 and 7, the relief at the shingle butts 53' may be lower and the tapers 54' may affect the plastic coating only part of the course-length and the roll may be shaped accordingly or employed under lighter pressure.

In producing the "shadow effect" shown in Figs. 6 and 7, pressure sufficient to embed the coarse color-coat particles to their crests constituting their contact surfaces is confined to the areas 56 of the material close to the edges 53' and to the sharply defined kerfs 55, and through selected shadow-blend areas 57 the pressure is gradually decreased so as to depress the particles of the color coat to less and less extent into the plastic mass. Consequently on the areas that are to appear in high relief the color of the color coat particles strongly predominates in the shadow blend areas 57 the black asphaltic coating appears increasingly in the surface voids between particles of the color coat; and in the deep shadow areas the black of the asphaltic coating predominates owing to the large aggregate extent of its exposure in the surface voids of the granular coating.

The illusory shadow effect produced by the intermingling of the lighter colored particles and darker asphaltic coating gives to the product an appearance of relief-depth much greater than that physically present, and yet the predominance of the lighter color of the granules over large areas of the product, aided by the continued, though diminishing display of light colored particles toward and in the deep shadow areas conveys to the eye fictitiously the semblance of uniform color, merely over-shadowed because of depth of physical depressions in the surface.

The web A, after its treatment aforesaid to produce the physical relief, with or without correlated illusory shadow-effects, as described passes over the guide rollers 65—65 which may be water cooled to absorb portions of the heat of the relatively hot sheet and spaced apart so as to expose relatively large surface areas of the sheet to the cooling effect of the contacting air. The sheet may then be slitted, by the slitting knives 67—67 into multiple strips that may each contain a desired number of shingle courses, after which the strips pass between driving rollers 68—68 on to guide tables 69—69', respectively, after which the strips may be wound into rolls 70—70', respectively, for shipment.

While I have herein described with particularity the details of one advantageous practice of my invention and means suitable for the specified uses, it will be understood that many changes in detail may be made within the spirit of my invention and the scope of the appended claims.

Having described my invention, what I claim is:

1. Steps in the art of making roofing and the like, which consist in depositing upon a constantly moving sheet a uniform coating of hot plastic material; effectively covering said coating with a granular coating, of color contrasting with that of said plastic material and before said plastic material cools, pressing portions of said granular coating into said plastic material in tapering zones gradually increasing to varying depth thereby to submerge certain granular particles in said plastic material to greater extent than others and thereby more or less gradually to blend the colors of said coatings.

2. Steps in the art of making roofing or the like, which consist in depositing upon a constantly moving sheet, a uniform coating of hot plastic material; effectively covering said sheet with a granular coating of color, contrasting with that of said plastic material, and before said plastic material cools, pressing portions of said granular coating into said plastic material in tapering zones to gradually increasing depth to submerge certain granular particles in said plastic material to greater extent than others to blend more or less gradually the colors of said coatings, and in other adjacent zones submerging other granular particles in said plastic material by application of greater pressure to expose the plastic material preponderatingly.

3. Steps in the art of making roofing or the like, which consist in depositing upon a constantly moving sheet, a uniform coating of hot plastic material; placing on said sheet a granular coating, of color contrasting with that of said plastic material, and before said plastic material cools, impressing in the yielding materials tapering zones gradually increasing in depth in which the exposure of the outer coating decreases as the depth is increased.

4. Steps in the art of making roofing or the like, which consist in depositing on a flat surface a coating of plastic material; effectively covering said material with a coating of granular material, of color contrasting with that of the plastic material, and submerging in said plastic material certain of the particles of said granular material to a greater or less degree than other particles in tapering zones gradually increasing in depth to blend the colors of the said coats.

5. Steps in the art of making roofing or the like, which consist in depositing upon a base sheet a coating of plastic material; effectively covering said sheet with a granular coating, of color contrastingly lighter than that of said plastic material; impressing abrupt, sharply defined shoulders in the face of said sheet and submerging certain particles of the granular material in said plastic material, in tapering zones extending from said shoulders in decreasing depth in which the exposure of said granular material gradually increases as the depth decreases toward the submerged particles to blend the colors of the coats thereby to produce an exaggerated shadow effect of said shoulders.

6. The art of making roofing, or the like, which consists in substantially saturating a sheet of absorbent material with a waterproofing substance while hot; partially cooling said strip; depositing thereon a coating of plastic material; applying a coat of granular material on said plastic coat, of color contrasting with that of said plastic coat; applying pressure in selected zones to submerge portions of said granular material in varying degrees in said plastic coat; continuously moving the sheet and coating the finished sheet while moving.

7. Steps in the art of making prepared roofing which consist in providing a layer of dark plastic material and producing a shadow-effect on certain areas of said layer by depositing on said layer a body of lighter-colored granular particles sufficient in quantity substantially to conceal the plastic layer in selected areas thereof, and depressing such particles to gradually increasing depth into the plastic layer in selected areas, so causing the dark plastic material to appear between the granular particles, to gradually increasing extent.

8. Steps in the art of making roofing and the like which consist in coating a plastic surfaced sheet with a layer of contrastingly colored granular material, and in selected zones submerging the granules of the layer to increasing depth into the plastic, thereby blending gradually the colors of the plastic and the granular layer.

In testimony whereof I hereunto set my hand in the presence of two subscribing witnesses.

WILLIAM F. McKAY.

In the presence of—
 FORÉE BAIN,
 MARY F. ALLEN.